(12) United States Patent
Wang

(10) Patent No.: US 9,465,534 B2
(45) Date of Patent: Oct. 11, 2016

(54) METHOD FOR AUTOMATIC COMPUTERIZED PROCESS CONTROL, AND COMPUTERIZED SYSTEM IMPLEMENTING THE SAME

(71) Applicant: Softfoundry International Pte Ltd., Singapore (SG)

(72) Inventor: Kuan-Lan Wang, Taipei (TW)

(73) Assignee: SOFTFOUNDRY INTERNATIONAL PTE LTD., Singapore (SG)

( * ) Notice: Subject to any disclaimer, the term of this patent is extended or adjusted under 35 U.S.C. 154(b) by 65 days.

(21) Appl. No.: 14/566,158

(22) Filed: Dec. 10, 2014

(65) Prior Publication Data

US 2015/0205397 A1   Jul. 23, 2015

(30) Foreign Application Priority Data

Jan. 22, 2014 (TW) .............................. 103102284 U
Oct. 16, 2014 (TW) .............................. 103135847 U

(51) Int. Cl.

| | | |
|---|---|---|
| G06F 3/041 | (2006.01) | |
| G06F 3/0488 | (2013.01) | |
| G06Q 50/00 | (2012.01) | |
| H04M 1/725 | (2006.01) | |
| G06Q 10/10 | (2012.01) | |
| H04M 1/2745 | (2006.01) | |

(52) U.S. Cl.
CPC ......... *G06F 3/04883* (2013.01); *G06Q 10/101* (2013.01); *G06Q 50/01* (2013.01); *H04M 1/72519* (2013.01); *H04M 1/27455* (2013.01); *H04M 2250/22* (2013.01); *H04M 2250/62* (2013.01)

(58) Field of Classification Search
CPC .... G06F 3/041; G06F 3/04883; G06F 3/044; G06F 3/0444; G06F 3/048
See application file for complete search history.

(56) References Cited

U.S. PATENT DOCUMENTS

| | | | | |
|---|---|---|---|---|
| 2012/0242589 A1* | 9/2012 | Schmidt | .................. | G06F 3/041 345/173 |
| 2012/0317194 A1* | 12/2012 | Tian | ...................... | H04W 8/005 709/204 |
| 2013/0054697 A1* | 2/2013 | Cha | ..................... | H04N 21/2347 709/204 |
| 2014/0012587 A1* | 1/2014 | Park | ...................... | H04W 12/06 704/275 |
| 2014/0096179 A1* | 4/2014 | Ben-Shalom | ....... | H04L 63/0869 726/1 |

* cited by examiner

*Primary Examiner* — Md Saiful A Siddiqui
(74) *Attorney, Agent, or Firm* — Hamre, Schumann, Mueller & Larson, P.C.

(57) ABSTRACT

A method for automatic computerized process control includes: establishing a record of at least two pieces of data to respectively serve as at least two data codes, and at least one linking relationship between the data nodes, and performing an automatic process associated with the specific event according to the data nodes and the linking relationship in the record thus established. The data nodes and the linking relationship correspond to a specific event triggered by a user via a computerized system.

17 Claims, 10 Drawing Sheets

METHOD FOR AUTOMATIC COMPUTERIZED PROCESS CONTROL, AND COMPUTERIZED SYSTEM IMPLEMENTING THE SAME

CROSS-REFERENCE TO RELATED APPLICATION

This application claims priority to Taiwanese Application Nos. 103102284 and 103135347, respectively filed on Jan. 22, 2014 and Oct. 16, 2014.

FIELD OF THE INVENTION

The invention relates to a method and a system for automatic computerized process control, which may reduce time required for manual operation.

BACKGROUND OF THE INVENTION

By virtue of cooperation among hardware, software and communication techniques, smartphones have become popular. Via a touch control interface, users may easily add a lot of application programs into the smartphone.

However, since the touch control interface is the primary input interface of most, smartphones, users may get confused when it is intended to close one application program (first application program) and go to a functional option in a bottom layer of another application program (second application program). In such a situation, the user may need to close the first application program first, return to a desktop interface, open the second application program, go to the bottom layer of the second application program, and select the desired functional option, thereby requiring several touch operations in order to find the desired application program or functional option. In another example, a user who wants to hold a conference call using a communication application program (e.g., Skype) may need to drag multiple contact members one by one from a contact list to a group window, which may require a series of touch operations and which is time-consuming.

SUMMARY OF THE INVENTION

Therefore, an object of the present invention is to provide a method for automatic computerized process control, which may alleviate the above drawbacks of the prior art.

According to one aspect of the present invention, a method for automatic computerized process control is to be implemented by a computerized system, and comprises:

establishing a record of at least two pieces of data to respectively serve as at least two data nodes, and at least one linking relationship between said at least two data nodes, said at least two data nodes and said at least one linking relationship corresponding to a specific event triggered by a user via the computerized system; and performing an automatic process associated with the specific event according to said at least two data nodes and said at least one linking relationship in the record thus established.

Another object of the present invention is to provide a computerized system that implements the method of the present invention.

According to another aspect of the present invention, a computerized system comprises:

an input unit configured for user input to trigger a specific event, a data storage unit, a display device, and a processing unit configured to:

detect the specific event triggered via the input unit, establish a record of at least two pieces of data to respectively serve as at least two data nodes, and at least one linking relationship between the at least two data nodes, the at least two data nodes and the at least one linking relationship corresponding to the specific event, store the record thus established into the data storage unit, perform an automatic process associated with the specific event according to the at least two data nodes and the at least one linking relationship in the record stored in the data storage unit, and control the display device to display a result of the automatic process.

BRIEF DESCRIPTION OF THE DRAWINGS

Other features and advantages of the present invention will become apparent in the following detailed description of embodiments with reference to the accompanying drawings, of which.

DETAILED DESCRIPTION OF THE EMBODIMENTS

Figure 1:
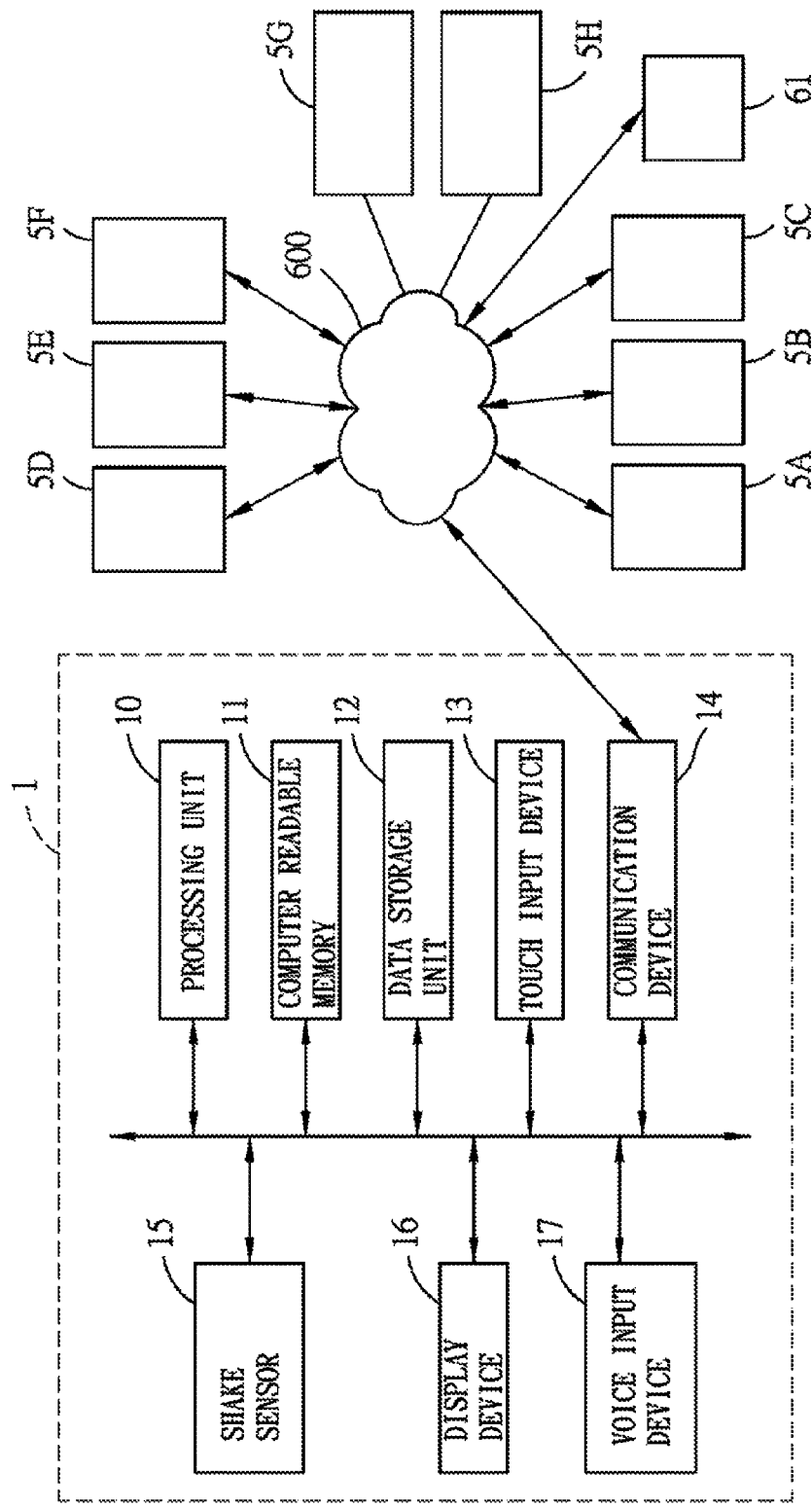
FIG. 1 is a block diagram illustrating an embodiment of the computerized system according to the present disclosure that communicates with other communication devices via a communication network.

Referring to FIG. 1, the embodiment of the computerized system according to this disclosure is a mobile phone 1 with touch control functionality (e.g., a smartphone) which includes a processing unit 10 (e.g., a processor), a computer readable memory 11, a data storage unit 12, a touch input device 13, a communication device 14, a shake sensor 15, a display device 16 (e.g., a liquid crystal display) and a voice input device 17 (e.g., a microphone).

The processing unit 10 is electrically coupled to the computer readable memory 11, the data storage unit 12, the touch input device 13, the communication device 14, the shake sensor 15, the display device 16 and the voice input device 17, and is configured to control the above components according to program instructions executed thereby.

The computer readable memory 11 may include various types of random access memories (RAM) that store the program instructions to be executed by the processing unit 10, and data generated during execution of the program instructions by the processing unit 10.

The data storage unit 12 may be a hardware component (e.g., a flash memory) that is capable of mass storage and that may store a plurality of application programs, such as desktop interface applications, communication applications and other types of applications.

The touch input device 13 may be a touch panel or other similar devices, and is configured for generation of an operation event that corresponds to user touch operations associated with applications and/or functional options, and that is provided to the processing unit 10.

The communication device 14 may be controlled by the processing unit 10 to establish connections with communication devices 5A-5H of other contact members via a communication network 600, for exchanging texts, speech, photos, audio/video data, etc. The communication network 600 may be a conventional wired or wireless communication network.

Figure 2:
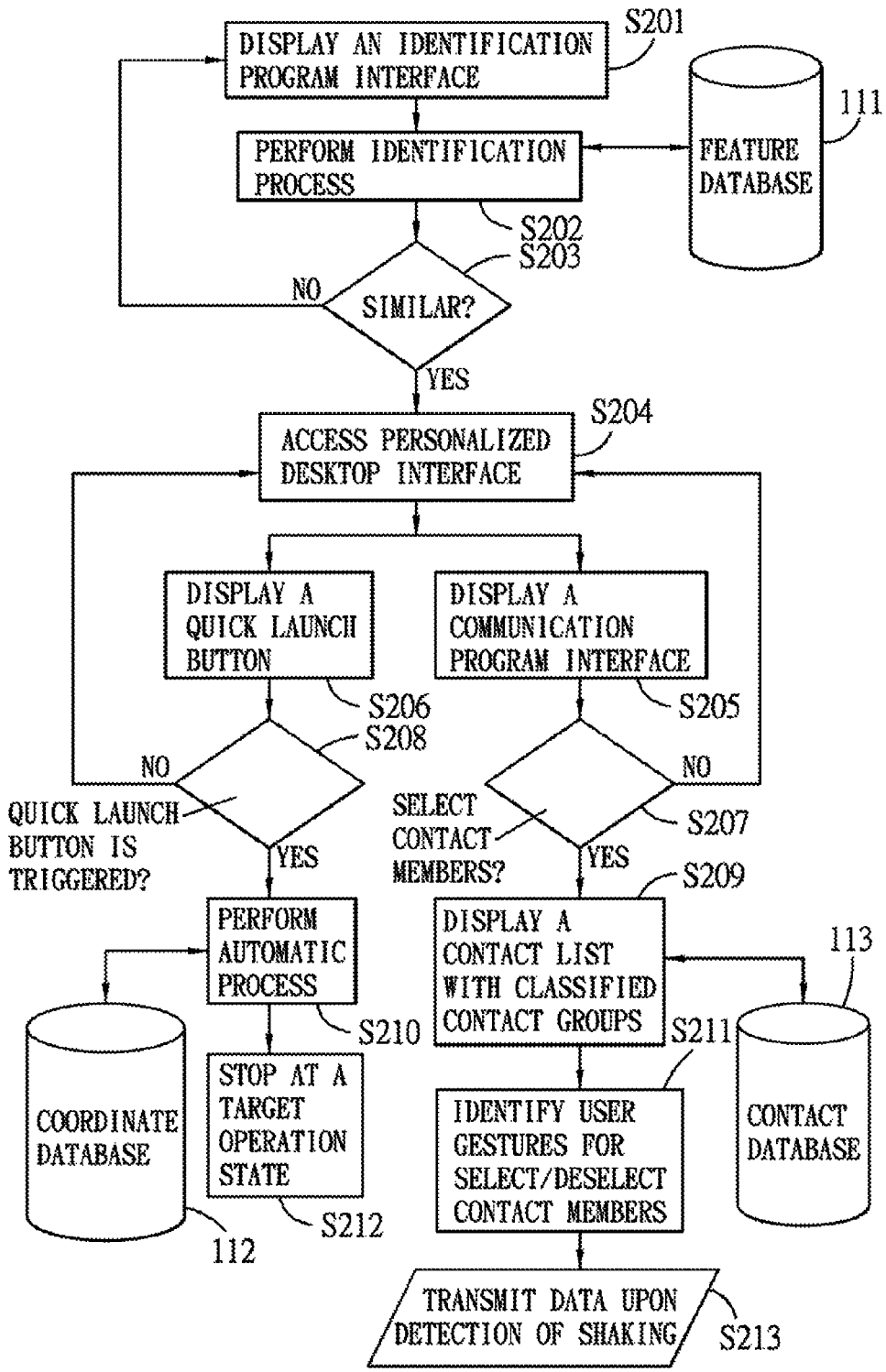
FIG. 2 is a flow chart illustrating an embodiment of the method for automatic computerized process control according to the present disclosure.

Further referring to FIG. 2, the embodiment of the method for automatic computerized process control is implemented primarily using the processing unit 10, and includes the following steps. In step S201, the processing unit 10 controls the display device 16 to display an identification program interface for confirming user identity. In step S202, the processing unit 10 cooperates with a feature database 111 to perform an identification process. The identification process may include: receiving to-be-confirmed data; and converting the to-be-confirmed data into feature data for subsequently identifying whether or not the feature data is similar to one piece of pre-established feature data. In this embodiment, only when the feature data is identified to be similar to the pre-established feature data, will the processing unit 10 be permitted to perform automatic processes that are exemplified hereinafter, in this embodiment, the to-be-confirmed data may be handwritten data inputted using the touch input device 13, or voice data inputted using the voice input device 17. In the case of the voice input, the mobile phone 1 may include/display a trigger button (not shown) for actuating the voice input device 17 to receive input of user voice to serve as the to-be-confirmed data for subsequent comparison with the pre-established feature data. Since voice data comparison may be implemented using conventional techniques, details thereof are omitted herein for the sake of brevity.

Figure 3:
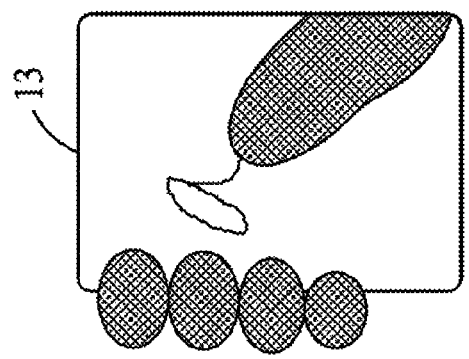
FIG. 3 is a schematic diagram illustrating input of a personalized symbol using a mobile phone with touch control functionality.

Referring to FIG. 3, the user may use a finger to input a personalized symbol via the touch input device 13 to serve as the to-be-confirmed data. Implementation of identifying the personalized symbol may be exemplified as follows.

Figure 4:
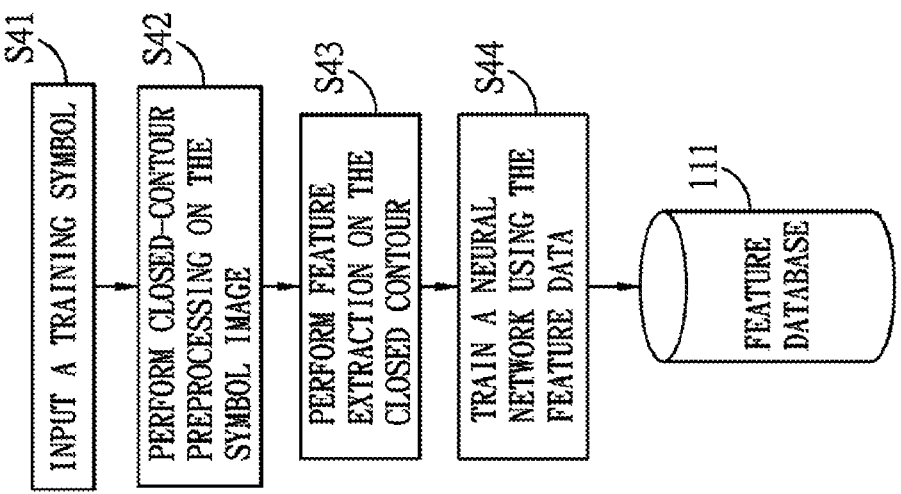
FIG. 4 is a flow chart illustrating steps of establishing a feature database in the embodiment.

Referring to FIG. 4, if the user has yet to input a personalized symbol into the computerized system, the user may need to input a training symbol via the touch input device 13. The processing unit 10 receives the training symbol (step S41) and generates a symbol image. In step S42, the processing unit 10 performs closed-contour preprocessing on the symbol image. The preprocessing may include: morphologically dilating lines of the symbol to form a closed-contour when the original contour of the symbol is not continuous. Then, the processing unit 10 performs feature extraction on the closed-contour (step S43) to obtain feature data. The feature data may be used to train a neural network (step S44), and the well-trained neural network may be provided for the feature database 111. In this embodiment, the feature data, such as X-Y coordinates and angles of traces of the symbol, is provided for wavelet transform, to thereby generate wavelet feature data that is inputted to the neural network for training purpose.

Figure 5:
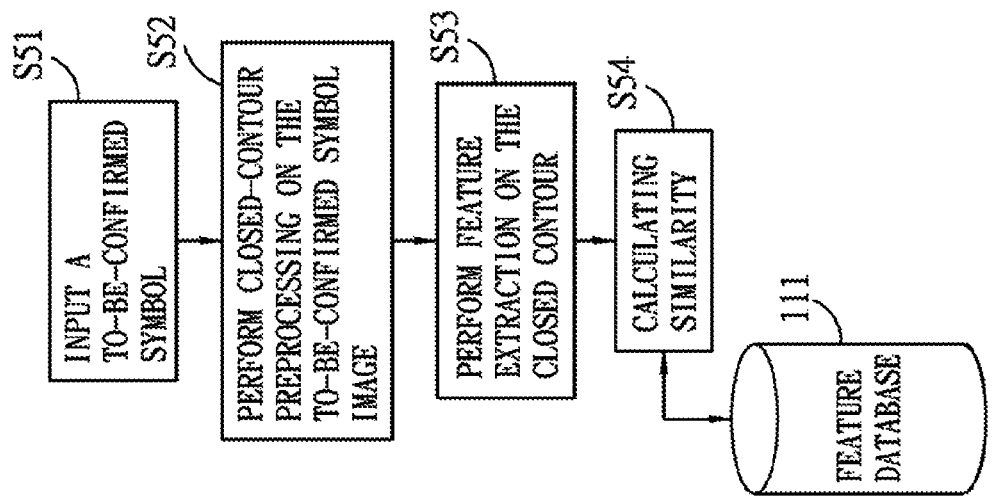
FIG. 5 is a flow chart illustrating steps of identification according to the feature database.

Referring to FIG. 5, after the feature database 111 is ready/well-trained, identification of the personalized symbol may be performed in steps S51-S54. In step S51, the processing unit 10 receives a to-be-confirmed symbol to generate a to-be-confirmed symbol image, followed by performing the closed-contour preprocessing (step S52), to thereby dilate the lines of the symbol to form a closed contour, and performing the feature extraction on the closed contour of the to-be-confirmed symbol (step S53), where the feature data thus extracted may include information of X-Y coordinates and angles. Then, the extracted feature data is transformed into wavelet feature data that is inputted to the well-trained neural network (i.e., the feature database 111), to thereby calculate similarity between the feature data extracted from the to-be-confirmed symbol (i.e., to-be-confirmed feature data) and the feature data pre-established in the feature database 111. Calculation of similarity may be implemented with reference to "Wavelet-based Off-line Signature Verification", which is a publication by Peter Shaohua Deng, et al., and is not described in detail herein. In other embodiments, confirmation of personal identity may be realized using voice recognition or other recognition techniques, and should not be limited to handwriting via touch sensing techniques.

Referring again to FIG. 2, after step S202 of the personalized symbol identification process, the processing unit 10 identifies whether or not the feature data obtained from the to-be-confirmed symbol is similar to one piece of pre-established feature data in the feature database 111 according to the similarity calculated in step S202. In this embodiment, a difference threshold is preset based upon experience. When the difference between the to-be-confirmed feature data and all of the pre-established feature data is greater than the difference threshold, the result of identity confirmation is negative (non-similar), and the flow goes back to step S201. On the other hand, when the difference between the to-be-confirmed feature data and at least one piece of the pre-established feature data is smaller than the difference threshold, the result of identity confirmation is positive (similar), and the user may be authorized to access a personalized desktop interface (step S204). The personalized desktop interface may simultaneously display a quick launch button (S206) and a communication program interface (S205). The processing unit 10 may need a coordinate database 112 for performing an automatic process corresponding to the quick launch button, and may need a contact database 113 for performing an automatic process corresponding to the communication program interface. Establishments of the coordinate database 112 and the contact database 113 are described as follows.

Figure 6:
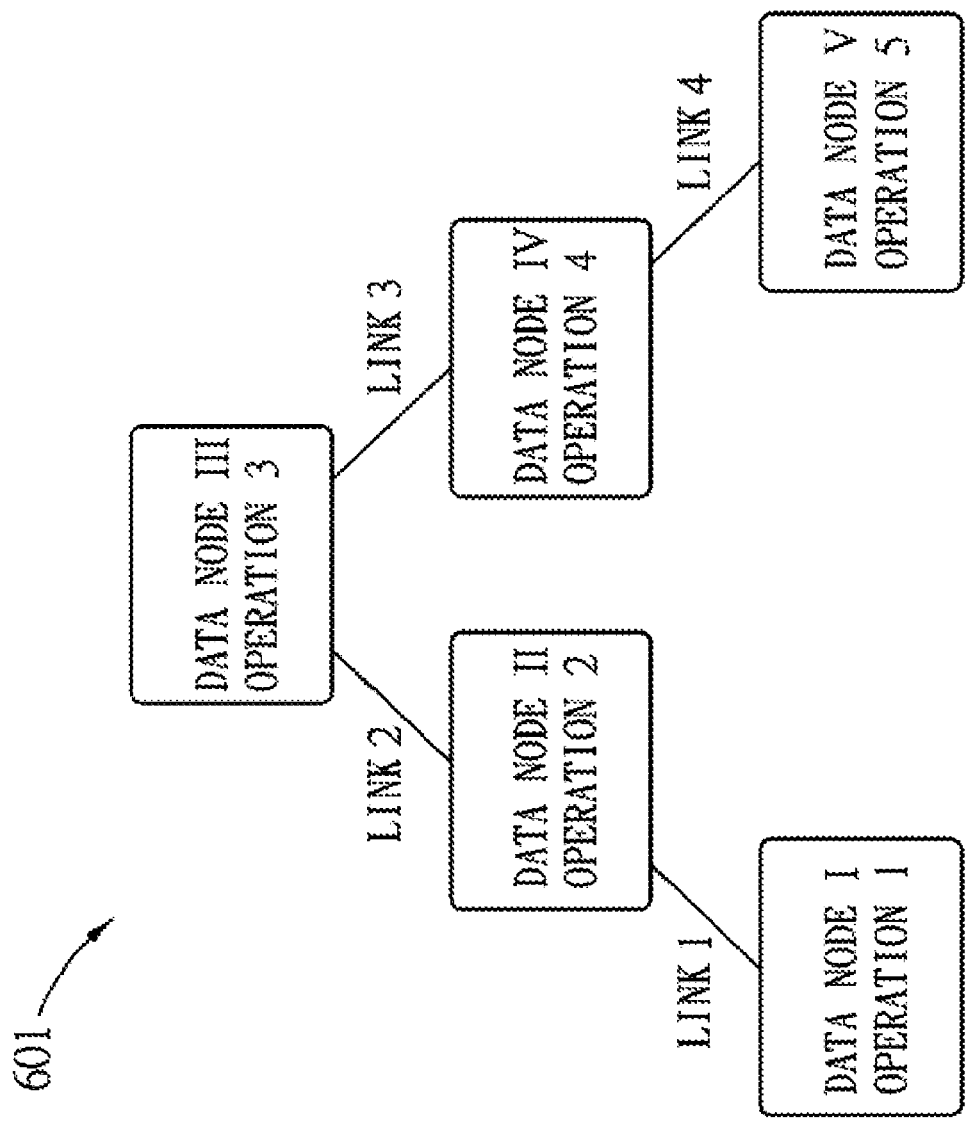
FIG. 6 is a schematic diagram illustrating linking relationships among data nodes of the disclosure.

Referring to FIG. 6, in this embodiment, a node-linking record 601 may be pre-established in the database 112 or 113. The node-linking record 601 may include a plurality of data nodes each representing a piece of data that is associated with a specific event triggered by the user, and a plurality of linking relationships among the data nodes. The linking relationships may be data of sequence or data of rank, which are described hereinafter. Then, the processing unit 10 performs the automatic process that is associated with the specific event according to the data nodes and the linking relationships of the node-linking record 601.

Figure 7:
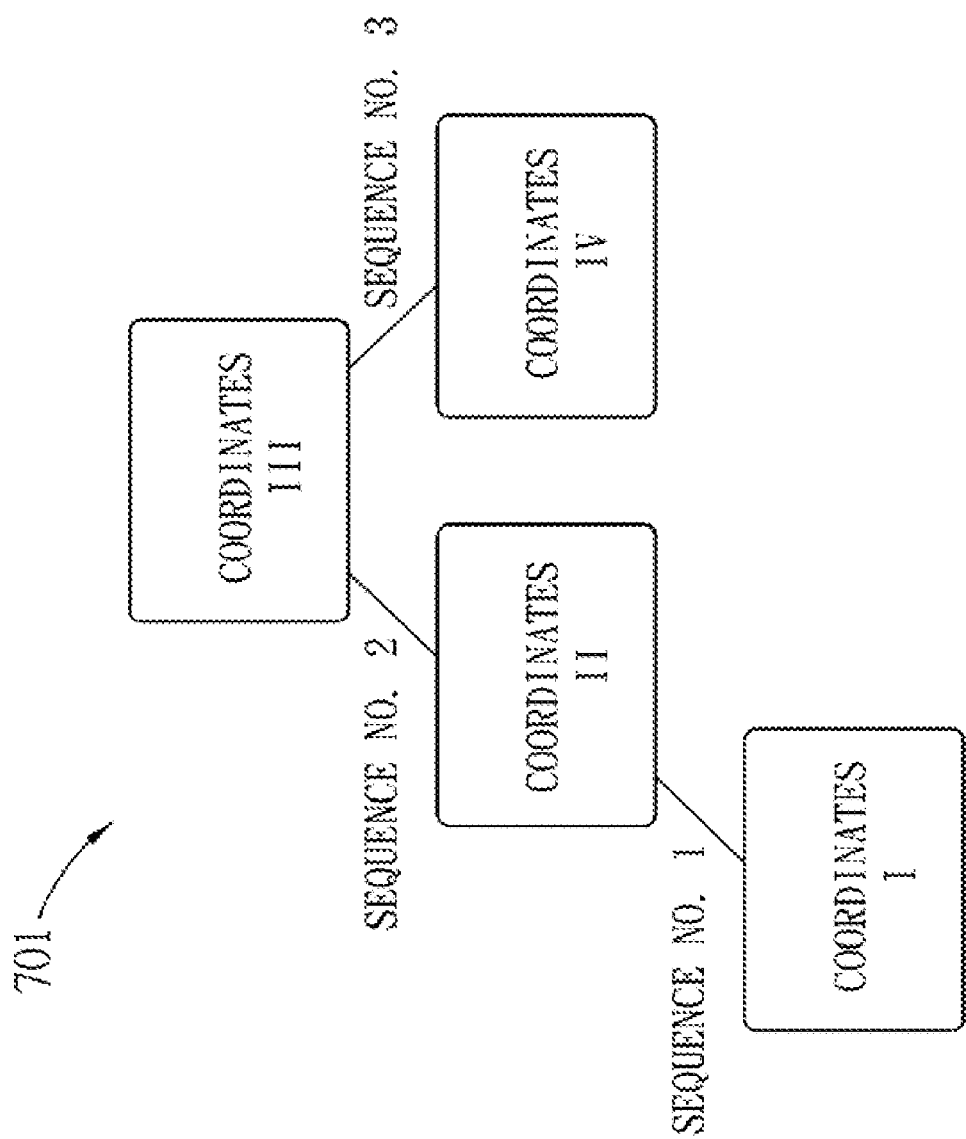
FIG. 7 is a schematic diagram illustrating linking relationships among data nodes of coordinates in the embodiment.

Referring to FIG. 7, a node-linking record 701 of coordinates is an embodiment of the node-linking record 601 as illustrated in FIG. 6, and is established in the coordinate database 112 (see FIG. 2). In this embodiment, the node-linking record 701 is established via operations on the touch input device 13. The data nodes are coordinates with respect to the touch input device 13 at which touch operations occurred, and the linking relationships are associated with a specific sequence of triggering of the coordinates, to thereby form the node-linking record 701 that is stored in the coordinate database 112. In one embodiment, the user may start establishing the node-linking record 701 by pressing and holding the quick launch button. Then, the processing unit 10 receives and records a series of subsequent user operations for executing desired applications/options until receipt of next pressing of the quick launch button, which represents an end of recording. For example, the coordinates I may represent a position of an "End" option of an application A, the coordinates II may represent a position of an application B on the desktop interface, the coordinates III may represent a position of an "Open a file" option of the application B, the coordinates IV may represent a position of an option for enabling an editing function, etc. In other embodiments, the coordinates may be associated with characters, numerals, symbols, etc. Hence, the present invention should not be limited in this respect.

Referring again to FIG. 2, in a situation where the node-linking record (hereinafter, the node-linking record 701 of coordinates is used as an example) has been stored in the coordinate database 112, after the processing unit 10 detects triggering/pressing of the quick launch button (step S208), the processing unit 10 performs the automatic process according to the coordinate database 112 (step S210). Note that detection of the triggering/pressing of the quick launch button may be substituted by such as a recognition process for handwritten data inputted via the touch input device 13, a recognition process for voice data inputted via the voice input device 17, etc. in other embodiments of this invention. The automatic process in this embodiment refers to automatic triggers of the coordinates in the specific sequence according to the node-linking record 701. That is, the processing unit 10 automatically triggers the position of the "End" option of the application A, the position of the application B on the desktop interface, the position of the "Open a file" option of the application B, the position of the option for enabling the editing function, etc., in the given sequence, and the process stops at a target operation state (step S212). For example, if the coordinates IV are the final coordinates of the node-linking record 701, the target operation state may be an editing screen of the application B, or an ordinary screen of the application B with the editing function enabled.

It should be noted that, triggering of the coordinates may be associated with clicking, swiping, continuous swiping, etc. The swiping refers to movement from one set of coordinates to another set of coordinates, and the continuous swiping may include plural sets of continuous coordinates.

Referring again to FIG. 2, the contact database 113 is another embodiment of the node-linking record 601 (see FIG. 6). In this embodiment, the data storage unit 12 of the mobile phone 1 stores a communication application program and a contact list that has information of a plurality of contact members. Further referring to FIG. 1 as an example, this embodiment may be implemented in conjunction with the communication devices 5A-5H, each corresponding to one of the contact members included in the contact list, and each being installed with, the same communication application program as that of the mobile phone 1. Note that the mobile phone 1 may obtain the contact list by connection to a cloud system 61. In this embodiment, the cloud system 61 is configured with compute unified device architecture (CUDA), and includes a plurality of super computing servers, each being capable of parallel computing.

In one embodiment, when the processing unit 10 performs a communication event between a message source and a message recipient, the message source and the message recipient may be stored as two data nodes in the contact database 113, and the linking relationship therebetween is a ranking value. Note that the mobile phone 1 may be either the message source or the message recipient. In other words, upon detecting occurrence of an operation event for communication (e.g., one contact member selects another contact member from the contact list via touch control to perform communication therebetween), the linking relationships between the relevant two data nodes may be updated by summing the ranking values therebetween.

In this embodiment, after establishment of the node-linking record, the processing unit 10 may use a Markov clustering algorithm to classify the contact members of the contact list according to the ranking values among the data nodes that represent frequencies of use. The Markov clustering algorithm includes providing a matrix of nodes and a standardized matrix, generation of an expand matrix by taking a matrix exponential with the matrix as a base and a predetermined number of the exponent, performing inflation calculation on the expand matrix using predetermined parameters, repeating calculations of the expand matrix and the inflation calculation until a convergence matrix is obtained, and obtaining several classified groups according to the convergence matrix.

The processing unit 10 may use the Markov clustering algorithm to classify the data nodes (which may include the contact members of the mobile phone 1, and/or further include the mobile phone 1 itself) of the data-linking records into a plurality of contact groups according to the ranking values (i.e., the linking relationships) among the data nodes, arranges a display order of the contact groups according to a sum of the ranking values among the data nodes corresponding to a respective one of the contact groups (e.g., arranging the contact group with a greater sum of the ranking values to be displayed with a higher priority, such as at a higher or relatively conspicuous position, and arranging the contact group with a smaller sum of the ranking values to be displayed with a lower priority, such as at a lower position), and automatically controls the display device 16 to display the contact list by displaying the contact groups in the display order thus arranged.

Figure 15:
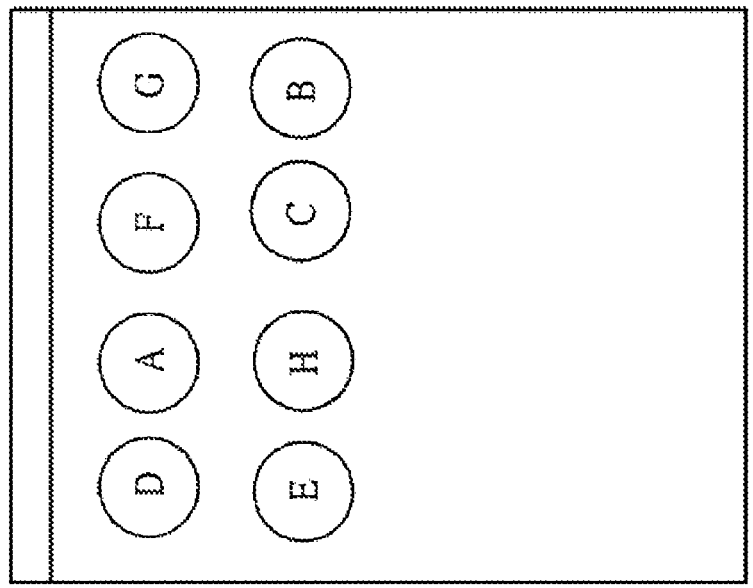
FIG. 15 is a schematic diagram illustrating an example of displaying a contact list.
Figure 14:
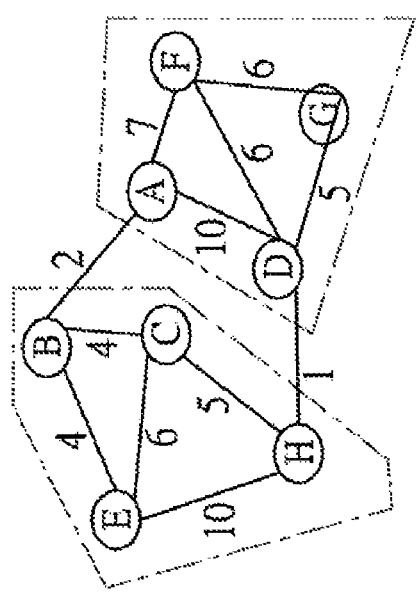
FIG. 14 is a schematic diagram illustrating an example of the data nodes and the linking relationships thereamong.

Referring to FIGS. 14 and 15 as an example, there are eight data nodes A to H included in the contact list, and a number between any two of the data nodes represent the ranking value therebetween. In this example, the ranking value is, but should not be limited to, a number of contacts therebetween. The processing unit 10 may use the Markov clustering algorithm to classify the data nodes A to H into a first contact group including the data nodes B, C, E and H, and a second contact group including the data nodes A, D, F and G. According to FIG. 14, a sum of the ranking values of the first contact group is 4+4+5+6+10=29, and a sum of the ranking values of the second contact group is 5+6+6+7+10=34, which is greater than that of the first contact group. Therefore, referring to FIG. 15, the processing unit 10 may configure the display device 16 to display the second contact group in a position above the first contact group. In addition, for each of the contact groups, a display order of the contact members may be arranged according to the ranking values among the data nodes corresponding thereto.

Figure 10:
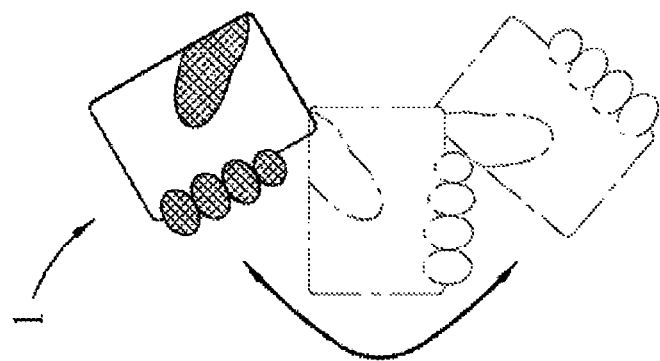
FIGS. 8 to 10 are schematic diagrams illustrating user operations on the mobile phone with touch control functionality respectively for selection, de-selection and instant communication in the embodiment.
Figure 9:
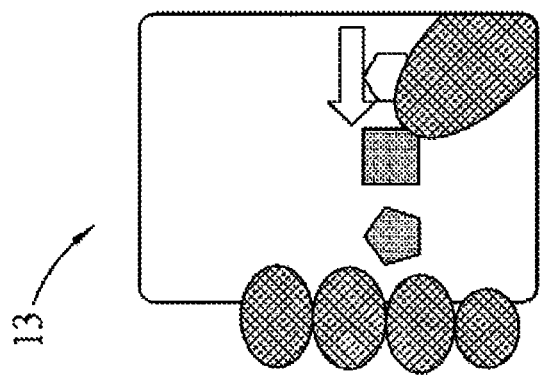
Figure 8:
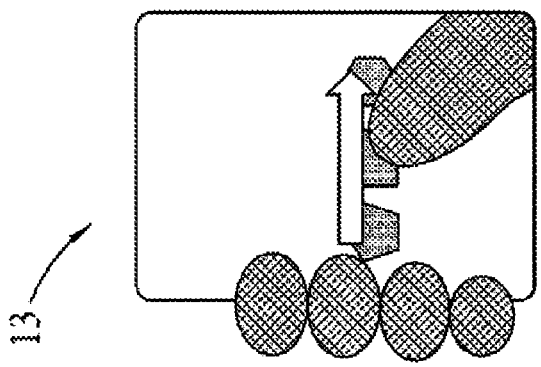

Referring again to FIG. 2, after step S205, when the processing unit 10 detects user operation for selecting contact members (step S207), the processing unit 10 automatically configures the display device 16 to display the contact list with the classified contact groups (step S209), and updates the contact database 113 using the Markov clustering algorithm. Then, the processing unit 10 may create a selection list upon detection and identification of user gestures (step S211). In one example as shown in FIG. 8, via the touch input device 13, the user may perform a first gesture in a first direction on one of the contact members, and the processing unit 10 selects said one of the contact members for inclusion into the selection list. In another example as shown in FIG. 9, via the touch input device 13, the user may perform a second gesture in a second direction on one of the contact members included in the selection list, and the processing unit 10 removes/deselects said one of the contact members on which the second user gesture operates from the selection list. In this embodiment, the first direction may be horizontal or vertical, and the second direction is opposite to the first direction. However, the present invention should not be limited in this respect. Then, the processing unit 10 may be configured to, upon the shake sensor 15 sensing shaking of the mobile phone 1 (see FIG. 10), control the communication device 14 to transmit data to the communication device of each of the contact members that is in the selection list (step S213). The transmitted data may be associated with at least one of a network meeting, an instant message, a text, a voice, an image and a video.

Figure 11:
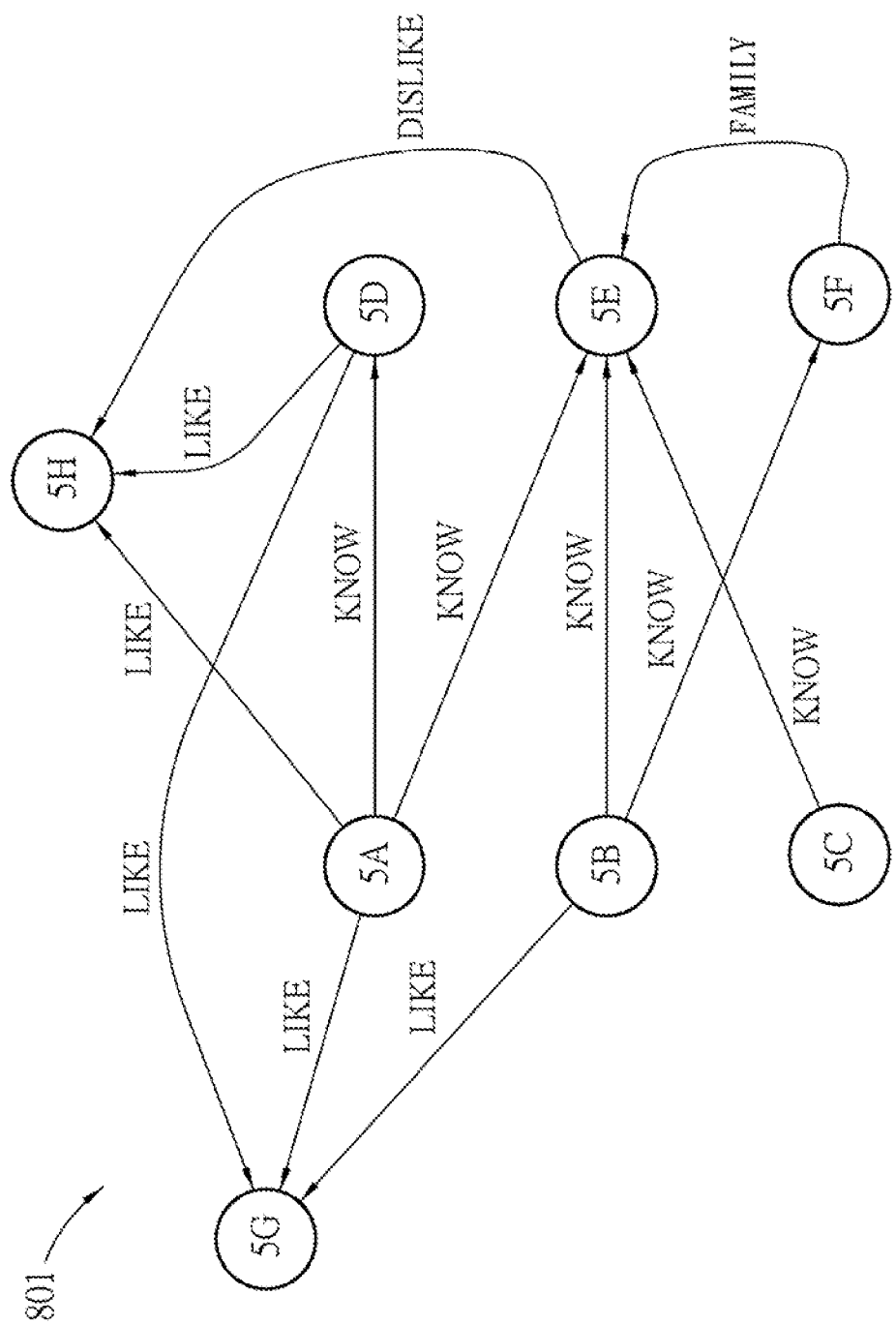
FIG. 11 is a schematic diagram illustrating linking relationships among data nodes of another embodiment.

Referring to FIGS. 1 and 11, in another embodiment, the node-linking record 801 among the communication devices 5A~5H (one of them may be the mobile phone 1) may be established by user operation of at least one of the following operations for at least one of the contact members included in the contact list: pressing a "like" button, pressing a "dislike" button, marking the contact members as "know" and marking the contact members as "family".

Figure 12:
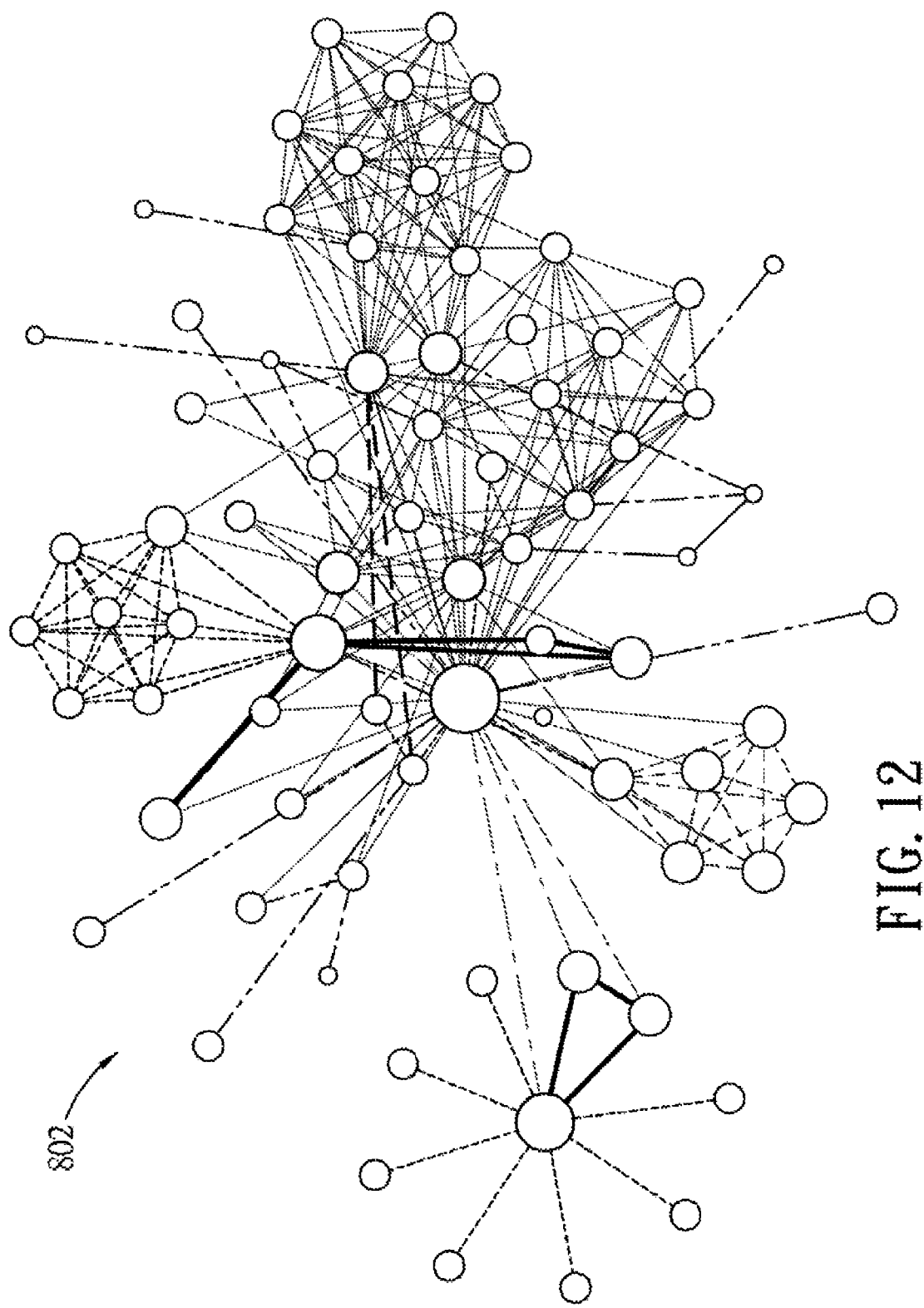
FIG. 12 is a schematic diagram illustrating that the linking relationships among the data nodes may be formed by accumulation of user operations.

Referring to FIG. 12, operations of similar events may be continuously accumulated, to thereby establish a node-linking record 802 with a variety of linking relationships in the mobile phone 1.

Figure 13:
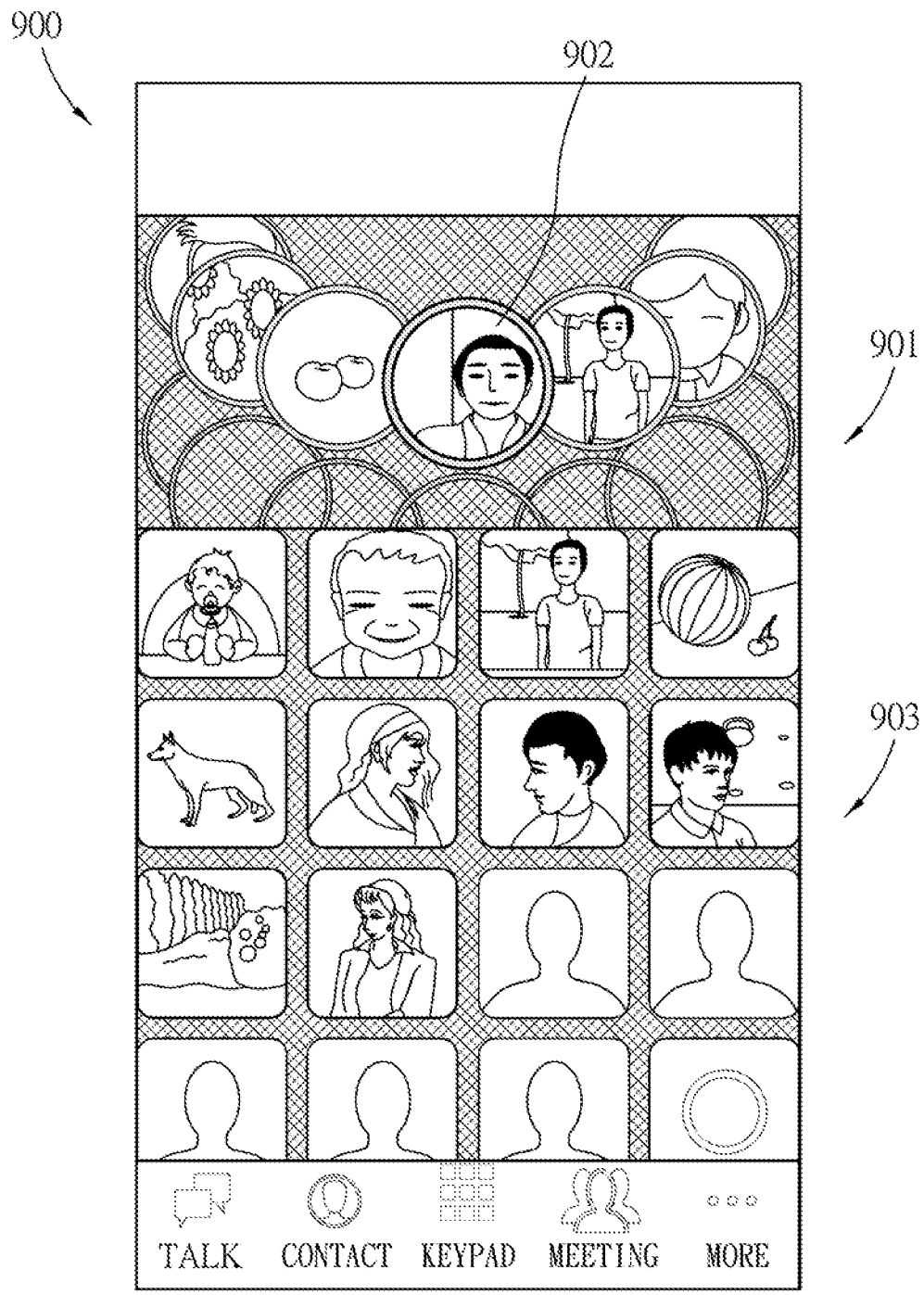
FIG. 13 is a schematic diagram illustrating a three-dimensional display manner of a contact list, which is set using the method according to the present disclosure.

Referring to FIG. 13, the contact list processed by the method of the present disclosure may be displayed in a three-dimensional manner as described hereinafter. The processing unit 10 may configure the display device 16 to display a primary contact list 901 by displaying the contact members thereof in a two-dimensional array within one frame 900. For example, a plurality of the contact members may be shown with photos that are arranged in multiple rows of loops. In FIG. 13, each circle shows a photo of a contact member, and the user may select one row of the contact members to be shown in a conspicuous manner by touch control. In addition, the processing unit 10 may configure the display device 16 to display a secondary contact list 903 in the same frame 900. The secondary contact list 903 may include a plurality of contact persons chat are associated with one of the contact members 902 included in the primary contact list 901, and that are displayed in the frame 900 in a form of a two-dimensional array. Accordingly, the primary contact list 901 of the mobile device 1 and the secondary contact list 903 of at least one of the contact members 902 of the mobile device 1 may be simultaneously displayed within the frame 900, to thereby facilitate quick selection of the contact members and contact persons for holding a subsequent conversation or meeting. In this embodiment, the primary contact list 901 includes a predetermined number (e.g., 20) of the most frequently used contact members, and is displayed within the circles on the top of the frame 900. When any one of the contact members included in the primary contact list 901 is rotated to the top position of the loop, the contact persons of that particular contact member may be displayed as the secondary contact list 903 for facilitating invitation to a conversation or meeting. For example, when a user performs a third gesture (e.g., a horizontal or vertical swiping), which may be the same as the aforesaid first or second gesture, or a different gesture, on one of the contact persons included in the secondary contact list 903, the processing unit 10 selects said one of the contact persons for inclusion into the aforementioned selection list.

In another embodiment of the method for automatic computerized process control according to the present disclosure, the data storage unit 12 further stores a file therein, and the specific event is associated with triggering adjustment of a display manner of the file on the display device 16, such as setting a display ratio to be 50% and splitting a frame of display. After detecting the aforementioned user operations, the processing unit 10 may store the two user operations as two data nodes. After confirmation of the user identity, the processing unit 10 may automatically configure the display device 16 to display the file in the manner thus stored, that is, to display the file with the display ratio of 50% and split frames, to thereby facilitate users to load the frequently used operation mode.

In summary, the method and the computerized system 100 for automatic computerized process control according to the present disclosure may establish a record of the data nodes and the linking relationships that are associated with an operation event, and perform an automatic computerized process according to the data nodes and the linking relationships after confirmation of the user identity, to thereby simplify user operation, reduce time for operation, and satisfy personal operation preferences.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for automatic computerized process control, the method to be implemented by a computerized system, the method comprising:
   establishing a record of at least two pieces of data to respectively serve as at least two data nodes, and at least one linking relationship between the at least two data nodes, the at least two data nodes and the at least one linking relationship corresponding to a specific event triggered by a user via the computerized system; and
   performing an automatic process associated with the specific event according to the at least two data nodes and the at least one linking relationship in the record thus established,
   wherein:

the at least two data nodes include more than three data nodes;

the computerized system is associated with one of the at least two data nodes, and has a plurality of contact members respectively corresponding to other ones of the at least two data nodes;

the specific event is associated with a user operation, the user operation being associated with at least one of the plurality of contact members and being via the computerized system;

the at least one linking relationship represents a ranking value between two corresponding ones of the at least two data nodes, wherein the ranking value is associated with the user operation between the two corresponding ones of the at least two data nodes; and the method further comprises classifying the plurality of contact members into a plurality of contact groups based upon the ranking value among the at least two data nodes using a clustering algorithm;

wherein the automatic process includes automatically arranging a display order for the plurality of contact groups according to a sum of the ranking values among the at least two data nodes corresponding to a respective one of the plurality of contact groups, and automatically displaying the plurality of contact groups on a display device of the computerized system according to the display order.

2. The method according to claim 1, further comprising, before the performing the automatic process associated with the specific event according to the at least two data nodes and the at least one linking relationship in the record thus established, confirming user identity by:

receiving to-be-confirmed data by one of handwritten input using a touch input device of the computerized system, and a voice input using a voice input device of the computerized system;

converting the to-be-confirmed data into feature data; and identifying whether or not the feature data is similar to one piece of pre-established feature data, wherein the automatic process is performed upon identifying that the feature data is similar to the pre-established feature data.

3. The method according to claim 1, wherein:

the computerized system stores a contact list that has information of the plurality of contact members;

the establishing the record of the at least two pieces of data to respectively serve as the at least two data nodes includes: after occurrence of the specific event, updating, for each pair of the at least two data nodes that are involved in the specific event, the ranking value therebetween; and the automatic process includes: automatically displaying the contact list on the display device according to the display order.

4. The method according to claim 3, wherein the specific event includes user operation of at least one of the following operations for at least one of the plurality of contact members via the computerized system: pressing a "like" button, pressing a "dislike" button, marking the at least one of the plurality of contact members as "know", and marking the at least one of the plurality of contact members as "family".

5. The method according to claim 3, wherein the performing the automatic process associated with the specific event according to the at least two data nodes and the at least one linking relationship in the record thus established includes displaying the contact list by the plurality of contact members in a form of a two-dimensional array;

the ranking value between two of the at least two data nodes being associated with a number of a user operation therebetween; and for each of the plurality of contact groups, the display order of the plurality of contact members is arranged according to the ranking value among the two of the at least two data nodes corresponding thereto.

6. The method according to claim 5, wherein the computerized system includes a touch input device configured to sense user gestures applied thereon, and, the performing the automatic process associated with the specific event according to the at least two data nodes and the at least one linking relationship in the record thus established includes arranging the plurality of contact members in the display order in one of a plurality of horizontal lines and a plurality of vertical lines of the two-dimensional array, and the method further comprises:
identifying, via the touch input device, a first direction of a first user gesture operating on one of the plurality of contact members, and selecting one of the plurality of contact members for inclusion into a selection list, the first direction being horizontal or vertical;

identifying, via the touch input device, a second direction of a second user gesture operating on the one of the plurality of contact members included in the selection list, and removing the one of the plurality of contact members on which the second user gesture operates from the selection list, the second direction being opposite to the first direction; and after sensing shaking by the computerized system, transmitting data to each of the plurality of contact members that is in the selection list, the data being associated with at least one of a network meeting, an instant message, a text, a voice, an image, and a video.

7. The method according to claim 6, wherein the performing the automatic process associated with the specific event according to the at least two data nodes and the at least one linking relationship in the record thus established further includes:

displaying another contact list associated with one of the plurality of contact members on the display device in a form of a two-dimensional array.

8. The method according to claim 7, wherein the another contact list includes a plurality of contact persons that are associated with the one of the plurality of contact members and that are displayed on the display device in the form of the two-dimensional array, and the method further comprises:
identifying, via the touch input device, a third user gesture operating on one of the plurality of contact persons, and selecting the one of the plurality of contact persons for inclusion into the selection list.

9. A computerized system, comprising:

an input unit configured for user input to trigger a specific event, a data storage unit, a display device, and a processing unit configured to:

detect the specific event triggered via the input unit, establish a record of at least two pieces of data to respectively serve as at least two data nodes, and at least one linking relationship between the at least two data nodes, the at least two data nodes and the at least one linking relationship corresponding to the specific event, store the record thus established into the data storage unit, perform an automatic process associated with the specific event according to the at least two data nodes and the at least one linking relationship in the record stored in the data storage unit, and control the display device to display a result of the automatic process;

wherein:

the at least two data nodes include more than three data nodes;

the computerized system is associated with one of the at least two data nodes, and has a plurality of contact members respectively corresponding to other ones of the at least two data nodes;

the specific event is associated with a user operation, the user operation being associated with at least one of the plurality of contact members and being via the computerized system;

the at least one linking relationship represents a ranking value between two corresponding ones of the at least two data nodes, wherein the ranking value is associated with the user operation between the two corresponding ones of the at least two data nodes; and the processing unit is further configured to classify the plurality of contact members into a plurality of contact groups based upon the ranking value among the at least two data nodes using a clustering algorithm; wherein the automatic process includes:

automatically arranging a display order for the plurality of contact groups according to a sum of the ranking values among the at least two data nodes corresponding to a respective one of the plurality of contact groups, and automatically displaying the plurality of contact groups on the display device according to the display order.

10. The computerized system according to claim 9, wherein:

the input unit is a touch input device, and occurrence of the specific event is associated with triggering plural sets of coordinates on the touch input device in a specific sequence;

the at least two data nodes respectively represent the plural sets of coordinates;

the at least one linking relationship represents the specific sequence of triggering the plural sets of coordinates on the touch input device; and the automatic process includes automatically triggering the plural sets of coordinates in the specific sequence.

11. The computerized system according to claim 9, wherein:

the input unit is one of a touch input device and a voice input device;

the processing unit is further configured to, before performing the automatic process, confirm user identity by:

receiving to-be-confirmed data by one of handwritten input using the touch input device, and a voice input using the voice input device;

converting the to-be-confirmed data into feature data;

identifying whether or not the feature data is similar to one piece of pre-established feature data; and the processing unit is configured to perform the automatic process upon identifying that the feature data is similar to the pre-established feature data.

12. The computerized system according to claim 9, wherein:

the data storage unit stores therein a contact list that has information of the plurality of contact members;

the specific event is associated with marking of at least one of the plurality of contact members on the contact list;

the processing unit is configured to:

after detecting occurrence of the specific event, update, for each pair of the at least two data nodes that are involved in the specific event, the ranking value therebetween; and the automatic process includes:

automatically displaying the contact list on the display device according to the display order.

13. The computerized system according to claim 12, wherein the specific event includes user operation of at least one of the following operations for at least one of the plurality of contact members via the input unit:

pressing a "like" button, pressing a "dislike" button, marking the at least one of the plurality of contact members as "know", and marking the at least one of the plurality of contact members as "family".

14. The computerized system according to claim 12, wherein the processing unit is further configured to control the display device to display the contact list by displaying the plurality of contact members in a form of a two-dimensional array;

the ranking value between two of the at least two data nodes is associated with a number of the user operation therebetween; and for each of the plurality of contact groups, the display order of the plurality of contact members is arranged according to the ranking values among the at least two data nodes corresponding thereto.

15. The computerized system according to claim 14, wherein:

the input unit is a touch input device configured to sense user gestures applied thereon;

the computerized system further comprises a shake sensor configured to sense shaking of the computerized system, and a communication device configured for data communication; and the processing unit is further configured to:

arrange the plurality of contact members in the display order in one of a plurality of horizontal lines and a plurality of vertical lines of the two-dimensional array, identify, via the touch input device, a first direction of a first user gesture operating on one of the plurality of contact members, followed by selecting the one of the plurality of contact members for inclusion into a selection list, the first direction being horizontal or vertical, identify, via the touch input device, a second direction of a second user gesture operating on one of the plurality of contact members included in the selection list, followed by removing the one of the plurality of the contact members on which the second user gesture operates from the selection list, the second direction being opposite to the first direction, and after the shake sensor senses shaking, configuring the communication device to transmit data to each of the plurality of contact members that is in the selection list, the data being associated with at least one of a network meeting, an instant message, a text, a voice, an image, and a video.

16. The computerized system according to claim 15, wherein the processor is further configured to cause the display device to display another contact list associated with one of the plurality of contact members on the display device in a form of a two-dimensional array.

17. The computerized system according to claim 16, wherein the another contact list includes a plurality of contact persons that are associated with the one of the plurality of contact members and that are displayed on the display device in the form of the two-dimensional array, the processor being further configured to identify, via the touch input device, a third user gesture operating on one of the plurality of contact persons, followed by selecting the one of the plurality of contact persons for inclusion into the selection list.

\* \* \* \* \*